March 7, 1961  A. CADELLA  2,973,781
AUTOMATIC HYDRAULIC TIMER VALVE
Filed July 16, 1959

INVENTOR.
ANTHONY CADELLA
BY
ATTORNEY.

United States Patent Office 2,973,781
Patented Mar. 7, 1961

2,973,781
AUTOMATIC HYDRAULIC TIMER VALVE
Anthony Cadella, 50 Fremont St., Bridgeport, Conn.
Filed July 16, 1959, Ser. No. 827,586
13 Claims. (Cl. 137—553)

The present invention relates to an automatic hydraulic timer valve for connection in a conduit for liquids such as water for automatically cutting off the flow of the liquid at the end of a pre-determined period. While the invention is adapted for various uses, it is particularly desirable for use in connection with a garden hose or lawn sprinkler system where the watering operation is carried on for an extended period and where it is desired to discontinue the operation automatically.

Under certain conditions it is desirable to carry on the watering operation for varying periods, and it is an object of the invention to provide improved means whereby the valve may be set to operate at the end of various pre-determined periods as, for instance, one-half hour, one hour, one-and-one-half hours and two hours. It is a further object to provide a valve which may be manually operated to shut off the supply of water at any time prior to the end of the pre-determined operative cycle. Another object is to provide indicating means which will visually indicate at any time during a pre-determined operative cycle the approximate time that the valve has been in operation.

A further object is to provide a timer valve of relatively simple and inexpensive construction and having a minimum number of movable parts.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

Figure 1:
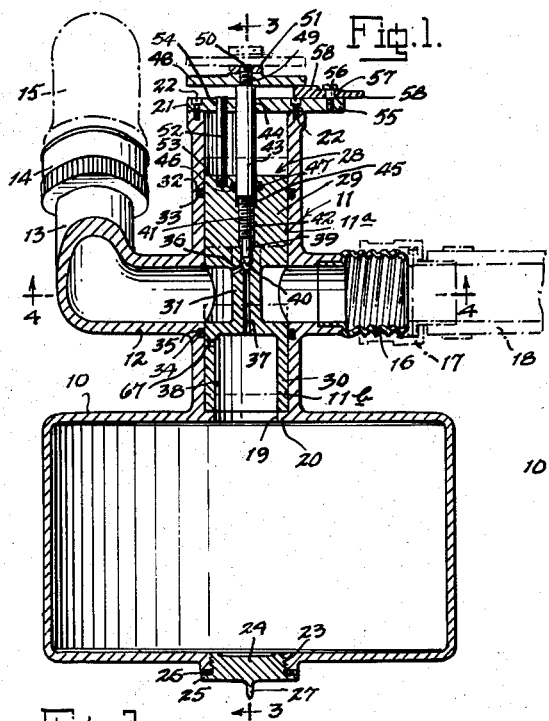
Fig. 1 is a vertical sectional view of the timer valve according to the invention, taken along the line 1—1 of Fig. 2, the same being shown in its open position.
Figure 3:
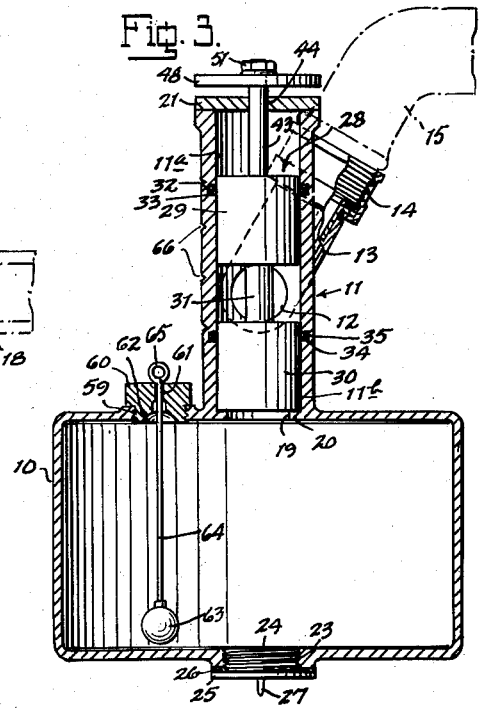
Fig. 3 is a vertical sectional view, taken along the line 3—3, Fig. 1.
Figure 2:
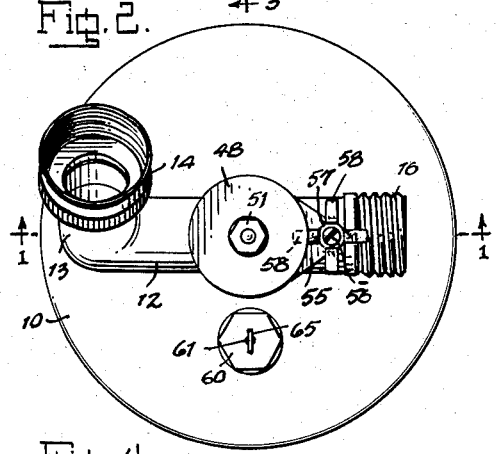
Fig. 2 is a top plan view.

Referring to the drawings the timer valve, according to the exemplary embodiment of the invention illustrated therein, comprises a body member, preferably in the form of a one-piece casting consisting of a reservoir 10 of hollow cylindrical form, a vertical cylinder 11 extending upwardly from the upper side of the reservoir 10, and a horizontal conduit 12 connected to and extending from opposite sides of the cylinder 11 with its horizontal passage extending across the interior of the cylinder 11. The conduit 12 is adapted to be connected at one end to a water supply, as for instance a faucet, and at its other end to a flexible hose for carrying water to a nozzle or sprinkler at a remote point, as for instance a lawn to be watered. For this purpose the conduit 12 is provided at its left hand end, as shown in Fig. 1, with an elbow extension 13 having mounted upon its outer end an internally threaded rotatable connector fitting 14 for attachment to the faucet 15 indicated in broken lines, and is provided at its right hand end with an externally threaded fitting 16 for connection to the internally threaded rotatable fitting 17 of a flexible hose 18 also indicated in broken lines. The elbow extension 13 is preferably disposed at an angle to correspond to the angle of the threaded end of a standard faucet, so that when the timer valve is attached thereto the cylinder 11 is disposed vertically.

The lower end of the cylinder 11 opens into the reservoir 10 through an opening 19 defined by an annular stop flange 20 provided interiorly at the lower end of the cylinder, and the upper end of the cylinder is closed by a cap plate 21 secured by screws 22. In the base of the reservoir 10 there is provided a threaded drainage opening 23 for draining water from the reservoir, as will hereinafter more fully appear, and which opening is normally closed by a threaded closure plug 24, preferably provided with an annular sealing flange 25 for pressure engagement with a sealing washer 26 and with a downwardly projecting lug 27 for convenient manual turning of the plug to engage or disengage it.

Within the cylinder 11 there is slidably engaged a piston member 28 consisting of an upper or first plug portion 29 disposed in the upper or first chamber part 11a of the cylinder above the water conduit 12, a lower or second plug portion 30 normally disposed in the lower or second chamber part 11b of the cylinder below the water conduit 12, and a reduced diameter neck portion 31 connecting the portions 29 and 30 and disposed diametrically across the passage through the water conduit 12 in the normal open position of the valve, the reduced diameter of the neck portion being sufficiently less than the internal diameter of the cylinder 11 that there is ample space for free flow of water through the water conduit around the neck portion.

Figure 5:
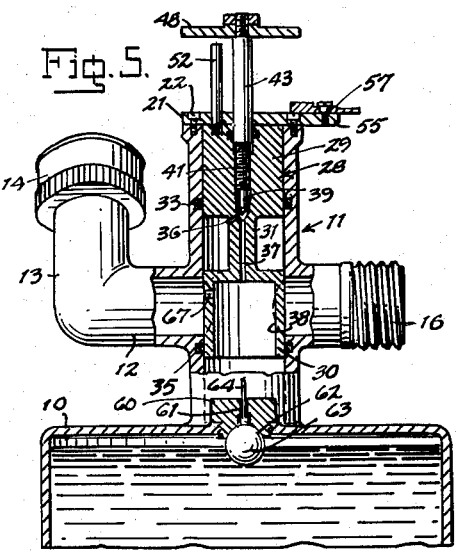
Fig. 5 is a vertical sectional view similar to Fig. 1, with parts broken away, and showing the valve in its closed position.
Figure 4:
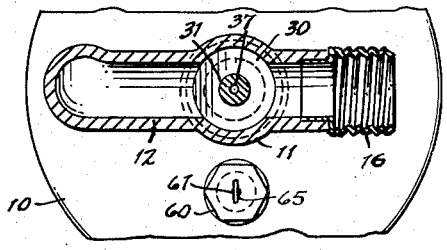
Fig. 4 is a horizontal sectional view, taken along the line 4—4 of Fig. 1.

The vertical dimension of the lower chamber 11b of the cylinder 11 is such that in the open position of the valve, as seen in Fig. 1, the lower plug portion 30 of the piston is engaged at its lower end with the stop flange 20 and has its upper end in a tangential plane in line with the lower side of the interior of the water conduit 12, while the vertical dimension of the upper chamber 11a is such that in the open position of the valve the lower end of the upper plug portion 29 of the piston is in a tangential plane in line with the upper side of the interior of the water passage 12, while its upper end is spaced downwardly from the cap plate 21 a distance sufficiently greater than the vertical distance between the upper plug portion 29 and the lower plug portion 30 of the piston that in the closed position of the valve, as seen in Fig. 5, the upper end of the upper plug portion 29 will abut the cap plate 21 while the upper end of the lower plug portion 30 extends for a short distance upwardly into the upper chamber 11a. Preferably the vertical heights of the upper plug portion 29 and the lower plug portion 30 of the piston are identical and their inner end surfaces are of corresponding area, so that there is a balanced water pressure effect thereon as water flows through the valve in its open position.

Within an annular groove 32 of the upper cylinder chamber 11a there is provided a sealing ring 33 of neoprene or other suitable resilient elastic material, and within the lower cylinder chamber 11b there is provided a similar annular groove 34 provided with a similar sealing ring 35, the respective sealing rings 33 and 35 being so positioned that they are at all times in engagement with the cylindrical surfaces of the respective upper and lower plug portions 29 and 30 of the piston. Thus the ring 33 is at approximately the mid-point of the upper cylinder chamber 11a while the ring 35 is adjacent the upper end of the lower cylinder chamber 11b.

Within the neck portion 31 of the piston, preferably adjacent its upper end, and directly opposed to the direction of flow of water through the water conduit 12 there is provided a vent hole 36 which communicates with a vertical duct 37 extending axially through the neck portion 31 and which opens at its lower end to a pocket 38 in the lower plug portion 30 of the piston. The pocket 38 preferably has a diameter corresponding to the diameter of the opening 19. As water flows through the water conduit 12 a very small amount continuously flows into the vent hole 36 and through the duct 37 and the pocket 38 to the reservoir 10. The amount of water flowing from the vent hole 36 to the conduit 37 is controlled by the setting of a needle valve 39 having a conical end which in the fully closed position will seat upon a conical seat 40 at the upper end of the duct 37, the inner end of the vent hole 36 opening to the surface of the conical seat so that it is thus closed in the seated position of the needle valve. In varying positions of disengagement from the seat the opening of the vent hole is varied, so that, depending upon the setting of the needle valve varying quantities of water may be made to flow from the vent hole to the duct 37 during a given period of time, for the purpose of controlling the automatic closing operation of the valve at the end of a pre-determined period, as will hereinafter more fully appear.

The needle valve 39 is integrally carried upon the lower end of a stem including a threaded shaft portion 41 engaged in a threaded hole 42 disposed axially of the upper plug member 29 of the piston and an upwardly extending cylindrical shank portion 43 slidably and rotatably engaged in a hole 44 provided centrally in the cap plate 21. The stem shank 43 also has sliding and rotatable engagement in a cylindrical passage 45 of the plug portion 29 extending upwardly from the threaded hole 42, this passage being provided with an annular recess 46 provided with a sealing ring 47 for sealing engagement with the stem shank 43 to thus cooperate with the sealing ring 33 to establish a watertight relation between the water conduit 12 and the cylinder chamber 11a at the upper side of the plug portion 29 of the piston.

Upon the upper end of the stem shank 43 there is fixedly secured a handle disk 48 having a central threaded hole 49 engaged by a threaded stud extension 50, a lock nut 51 being screwed upon the stud at the upper side of the handle disk to fixedly secure it to the stem. This handle disk serves to turn the stem 43 to adjust the needle valve 39, to manually move the piston 28 either to its closed position as seen in Fig. 1, or to its open position as seen in Fig. 5, or, in cooperation with gauge means presently to be more fully described, to gauge the setting of the needle valve. In order to fix the piston 28 against rotational movement in the cylinder 11 a dowel pin 52 is screwed at 53 in the upper side of the upper plug portion 29 of the piston and is slidably engaged in a passage 54 in the cap plate 21.

Upon an extension portion 55 of the cap plate 21 projecting laterally beyond the edge of the handle disk 48 there is rotatably mounted by means of a stud screw 56 a gauge member 57 provided with a plurality of radially extending finger portions 58 arranged so that one finger portion only is interposed at any one time beneath the handle disk 48. In the illustrated gauge four such fingers are shown, and these are of varying heights so that when the maximum height finger is interposed beneath the handle disk in the open position of the valve, and the needle valve 39 is turned by the handle disk to a point where the underside of the handle disk contacts the finger, the needle valve will be in its fully open position to permit the maximum flow of water from the vent hole 36, and consequently the shortest time period for filling the reservoir 10. When the minimum height finger is interposed beneath the handle disk 48 and the disk is turned to adjust the needle valve the latter will be in a position to allow the minimum flow of water from the vent hole 36, and hence the longest time period to fill the reservoir 10. In the illustrated example, the varying height fingers are respectively designated "½," "1," "1½" and "2" to indicate setting periods of one-half hour, one hour, one-and-one-half hours and two hours. Thus the maximum height finger is designated for the minimum one-half hour period and the minimum height finger is designated for the two hour maximum period.

Within a threaded hole 59 in the upper wall of the reservoir 10 there is screwed a threaded fitting 60 provided with a vertical air escape passage 61 opening at its lower end to a spherical seat 62 formed in the under end of the fitting 60 and adapted to be closed by a spherical float valve 63 provided with an elongated stem 64 extending in loose relation through the air passage 61, and having an upper loop end 65. The stem 64 is of sufficient length so that when the reservoir 10 is empty the float valve will be disposed adjacent the bottom of the reservoir, and, when the reservoir fills with water to the point where the float valve closes upon the seat 62 to close the air passage 61, the stem will extend above the fitting 60 along the side of the cylinder 11 to thus visually indicate the amount of water within the reservoir. Suitable calibrations, for example notches 66, may be provided upon the side of the cylinder 11 in such relation to the stem 64 that an indication will be given as to the amount of water in the reservoir as the upper loop end 65 of the stem becomes aligned with the respective calibration. This provides a visual indication of the progress of the operative cycle of the valve, and depending upon the time gauge setting shows the approximate elapsed and remaining time of the cycle.

Within the wall of the lower plug portion 30 of the piston, at a point near its upper end slightly below the sealing ring 35 and opposed to the direction of flow of water through the water conduit 12, there is provided an auxiliary water vent opening 67 adapted, as will presently more fully appear, to affect the quick closing of the valve following its initial pressure induced movement in closing direction. This initial movement takes place as the water level in the reservoir reaches the point where the float valve 63 closes upon its seat 62 and closes the air escape passage 61, as will be more fully pointed out in the following description of the operation of the time valve.

In the operation of the timer valve the piston 28 is first manually pressed downwardly to the open position as shown in Fig. 1, and the needle valve 39 is set to the desired predetermined time period by interposing the appropriate finger of the gauge 58 corresponding to the desired time period in relation to the handle disk 48. Thereupon the faucet is turned on and water flows freely through the water conduit 12 to the hose 18, while at the same time a small measured quantity of water passes through the vent hole 36 and the duct 37 to the reservoir 10, where it accumulates during the operative cycle causing the float valve 32 to gradually rise toward the valve seat 61. During this period air displaced in the reservoir escapes through the air passage 61 so that there is no build up of pressure upon the underside of the piston. Also during this period the equal areas of the opposed inner end surfaces of the upper and lower plug portions 29 and 30 of the piston disposed in tangential planes in line with the upper and lower sides of the passage through the water conduit 12 results in a substantially equalized pressure exerted upon the upper and lower plug parts of the piston, so that very little pressure will be required upon the lower part of the piston to move it from its open toward its closed position.

When the water level in the reservoir reaches the point where the float valve 63 engages the valve seat 62 and closes the air escape passage 61, an air trap is created between the surface of the water in the reservoir and the underside of the piston. As water continues to flow into the reservoir through the vent hole 36 and the duct 37 pressure builds up on the underside of the piston causing it to move toward its closed position. As this occurs the lower surface of the upper plug portion 29 moves upwardly into the upper cylinder chamber 11a while the upper surface of the lower plug portion 30 of the piston moves upwardly out of the lower cylinder chamber 11b, the imbalance of pressure upon the piston from the continued build up of pressure in the reservoir from water flowing through the vent hole 36 causing the piston to gradually move upwardly toward its closed position. The closing action is accelerated by the provision of the auxiliary vent hole 67 in the lower plug portion 30. As the piston reaches the point where the auxiliary vent hole 67 becomes exposed to the flow of water through the water conduit 12, as indicated by the broken lines in Fig. 1, the additional flow of water through the hole 67 into the reservoir results in a very rapid build up of pressure at the underside of the piston causing the piston to quickly snap to its closed position as seen in Fig. 5, thus closing off the supply of water to the hose. In the closed position the auxiliary air vent 67 is exposed to the pressure of water from the faucet, and thus the pressure at the underside of the piston continues to maintain it in its closed position until the supply of water is shut off at the faucet. In order to start another cycle of operation of the valve the water in the reservoir is drained off by removing and then replacing the closure plug 24, the piston 28 is manually pressed downwardly to its open position, the needle valve 39 is set to the desired time period by means of the gauge 58, and the faucet is turned on.

What is claimed is:

1. An automatic hydraulic timer valve, comprising a water conduit having a water passage therethrough having an inlet end and an outlet end, a piston guide housing interposed in said conduit passage between said inlet and outlet ends including a first part extending at one side of said conduit passage and a second part extending at the opposite side of said conduit passage, a reservoir connected to said second housing part, a piston slidably engaged in said housing for movement between an open position and a closed position and including a first part disposed in said first housing part, a second part normally disposed in said second housing part and an intermediate part connecting said first and second piston parts and normally disposed across said conduit passage to allow the passage of water therethrough past said intermediate part, stop means for locating said piston in its respective open and closed positions, water vent means establishing communication between said conduit passage and said reservoir to by-pass a fractional part of the water flowing through said conduit passage to said reservoir, normally oepn air-vent means in said reservoir, and means arranged to close said air-vent means when the accumulation of water in said reservoir reaches a predetermined level whereby a continued accumulation of water in said reservoir creates pressure upon said piston to cause said second piston part to move across said conduit passage to stop the flow of water to its said outlet end.

2. The timer valve as defined in claim 1, further characterized by control valve means for controlling the flow of water through said water vent means.

3. The timer valve as defined in claim 2, further characterized by gauge means for determining the setting of said control valve means.

4. The timer valve as defined in claim 1, wherein said water vent means comprises a passage to said reservoir opening in said intermediate part of said piston in opposed direction to the direction of flow of water through said conduit passage.

5. The timer valve as defined in claim 4, further characterized by control valve means carried by said piston for controlling the flow of water through said water vent means.

6. The timer valve as defined in claim 1, further characterized by auxiliary water vent means in said second piston part arranged to move into communication with said conduit passage as said piston initially moves in closing direction.

7. The timer valve as defined in claim 1, further characterized by stop means to limit the open position of said piston to a point where the inner end of said first piston part is substantially in line with one side of said conduit passage and the inner end of said second piston part is substantially in line with the opposite side of said conduit passage.

8. The timer valve as defined in claim 1, wherein said piston guide housing is cylindrical and of corresponding diameter at its first and second parts, and wherein said first and second piston parts are cylindrical and of corresponding diameter.

9. The timer valve as defined in claim 8, further characterized by stop means to limit the open position of said piston to a point where the inner end of said first piston part is substantially in line with one side of said conduit passage and the inner end of said second piston part is substantially in line with the opposite side of said conduit passage.

10. The timer valve as defined in claim 8, further characterized by stop means to limit the closed position of said piston to a point where the inner end of said second piston part is engaged in said first guide housing part and its outer end is engaged in said second guide housing part.

11. The timer valve as defined in claim 10, further characterized by auxiliary water vent means in said second piston part arranged to move into communication with said conduit passage as said piston initially moves in closing direction and to remain in communication with said conduit passage in the closed position of said piston.

12. The invention as defined in claim 1, further characterized by means for manually moving said piston to its open position.

13. The invention as defined in claim 1, further characterized by means for manually moving said piston to its open and closed positions.

No references cited.